US012755283B2

(12) United States Patent
Liu et al.

(10) Patent No.: US 12,755,283 B2
(45) Date of Patent: Oct. 6, 2026

(54) BLOCKCHAIN-BASED USER ELEMENT AUTHORIZATION METHODS AND APPARATUSES

(71) Applicant: ANT BLOCKCHAIN TECHNOLOGY (SHANGHAI) CO., LTD., Shanghai (CN)

(72) Inventors: Jiawei Liu, Hangzhou (CN); Chenkan Shen, Hangzhou (CN); Ge Jin, Hangzhou (CN); Chifei Zhang, Hangzhou (CN); Fansheng Kong, Hangzhou (CN)

(73) Assignee: Ant Blockchain Technology (Shanghai) Co., Ltd., Shanghai (CN)

( * ) Notice: Subject to any disclaimer, the term of this patent is extended or adjusted under 35 U.S.C. 154(b) by 175 days.

(21) Appl. No.: 18/506,586

(22) Filed: Nov. 10, 2023

(65) Prior Publication Data

US 2024/0078551 A1 Mar. 7, 2024

Related U.S. Application Data

(63) Continuation of application No. PCT/CN2022/089887, filed on Apr. 28, 2022.

(30) Foreign Application Priority Data

May 11, 2021 (CN) ........................ 202110511543.X

(51) Int. Cl.

*G06Q 20/02* (2012.01)
*G06Q 20/38* (2012.01)
*G06Q 20/40* (2012.01)

(52) U.S. Cl.

CPC ......... *G06Q 20/4014* (2013.01); *G06Q 20/02* (2013.01); *G06Q 20/38215* (2013.01); *G06Q 20/3829* (2013.01)

(58) Field of Classification Search

CPC .... G06Q 20/02; G06Q 20/3829; G06Q 20/40; G06Q 20/3821

See application file for complete search history.

(56) References Cited

U.S. PATENT DOCUMENTS

2019/0036932 A1 1/2019 Bathen et al.
2020/0244460 A1 7/2020 Zou
(Continued)

FOREIGN PATENT DOCUMENTS

AU 2019203848 5/2019
CN 107231351 10/2017
(Continued)

OTHER PUBLICATIONS

Ahmed; Turning Trust Around: Smart Contract-Assisted Public Key Infrastructure; 2018 17th IEEE International Conference On Trust, Security And Privacy In Computing And Communications, 2018, p. 104-111.*
(Continued)

*Primary Examiner* — Ilse I Immanuel
(74) *Attorney, Agent, or Firm* — Fish & Richardson P.C.

(57) ABSTRACT

Example blockchain-based user element authentication methods, apparatuses, systems and computer-readable media are provided. In an example, a node device in a blockchain receives a smart contract invocation transaction, where the smart contract invocation transaction includes an encrypted to-be-authenticated user element provided by a user client. In response to the smart contract invocation transaction, the node device invokes encryption conversion logic in the smart contract, decrypts the encrypted to-be-authenticated user element in a trusted computing environment, and performs secondary encryption processing. The user element authentication authority decrypts the to-be-authenticated user element and performs user element authentication. The node device obtains an authentication (Continued)

result submitted by the user element authentication authority and stores the authentication result in the blockchain. An authentication result user connected to the blockchain obtains the authentication result from the blockchain, and determines, based on the authentication result, authenticity of a user identity provided by the user client.

16 Claims, 5 Drawing Sheets

(56) References Cited

U.S. PATENT DOCUMENTS

| | | | | |
|---|---|---|---|---|
| 2020/0304315 | A1 | 9/2020 | Li et al. | |
| 2021/0067328 | A1 * | 3/2021 | Verheyen | H04L 63/0442 |
| 2021/0326476 | A1 * | 10/2021 | Su | H04L 9/50 |

FOREIGN PATENT DOCUMENTS

| | | | | |
|---|---|---|---|---|
| CN | 108965222 | | 12/2018 | |
| CN | 109067791 | | 12/2018 | |
| CN | 109922077 | | 6/2019 | |
| CN | 110555029 | | 12/2019 | |
| CN | 110581860 | | 12/2019 | |
| CN | 110599190 | | 12/2019 | |
| CN | 111095256 | | 5/2020 | |
| CN | 111316303 | | 6/2020 | |
| CN | 111460465 | | 7/2020 | |
| CN | 111625869 | | 9/2020 | |
| CN | 111737675 | | 10/2020 | |
| CN | 113221165 | | 8/2021 | |
| CN | 114372251 | | 4/2022 | |
| EP | 4362515 | A1 * | 5/2024 | H04L 9/3231 |
| KR | 10-2018-0129027 | | 12/2018 | |

OTHER PUBLICATIONS

Extended European Search Report in European Appln. No. 22806527.2, mailed on Oct. 2, 2024, 5 pages.

Chang et al., "Enhancing and Evaluating Identity Privacy and Authentication Strength by Utilizing the Identity Ecosystem," In Proceedings of the 2018 Workshop on Privacy in the Electronic Society, Jan. 15, 2018, p. 114-120.

Crosby et al., "BlockChain Technology: Beyond Bitcoin," Sutardja Center for Entrepreneurship & Technology Technical Report, Oct. 16, 2015, 35 pages.

International Preliminary Report on Patentability in Appln. No. PCT/CN2022/089887, mailed on Nov. 23, 2023, 12 pages (with English translation).

International Search Report and Written Opinion in Appln. No. PCT/CN2022/089887, mailed on Jun. 27, 2022, 14 pages (with English translation).

Li, "Identity Authentication System based on Block chain 3.0 Architecture," Journal of Suzhou University, Nov. 2019, 7 pages (with English Abstract).

Nakamoto, "Bitcoin: A Peer-to-Peer Electronic Cash System," www.bitcoin.org, 2008, 9 pages.

Yin et al., "A trusted loT architecture model," Telecommunications Science, 2017, 33(10): 10-18 (with English Abstract).

* cited by examiner

BLOCKCHAIN-BASED USER ELEMENT AUTHORIZATION METHODS AND APPARATUSES

CROSS-REFERENCE TO RELATED APPLICATIONS

This application is a continuation of PCT Application No. PCT/CN2022/089887, filed on Apr. 28, 2022, which claims priority to Chinese Application No. 202110511543.X, filed May 11, 2021, all of which are hereby incorporated by reference in their entireties.

TECHNICAL FIELD

This specification relates to the field of computer applications, and in particular, to blockchain-based user element authentication methods and apparatuses.

BACKGROUND

User element authentication usually means that a specific user element authentication authority determines whether several user elements including privacy information that are provided by a user match the specific user element authentication authority, to determine authenticity of an identity of an object indicated by the several user elements. However, in actual application scenarios, a large quantity of user element providers, user element authentication result users, and user element authentication authorities may co-exist. Therefore, it is difficult for the user to quickly identify a proper authentication authority to complete a user element authentication process.

In a related technology, a role of a mediator can be added to the above-mentioned interaction scenario. A user sends a to-be-authenticated user element to the mediator without being concerned about a subsequent procedure. An authentication authority obtains the to-be-authenticated user element from the mediator, and returns a corresponding user element authentication result, without a need to directly contact a user element provider and an authentication result user. However, in this solution, the user needs to send a user element including privacy data to the mediator, leading to unnecessary disclosure of privacy information. Therefore, a user element authentication solution in which both high efficiency and high security are considered is urgently needed in the industry.

SUMMARY

In view of this, this specification discloses blockchain-based user element authentication methods and apparatuses.

According to a first aspect of the embodiments of this specification, a blockchain-based user element authentication method is disclosed, and is applied to a node device in a blockchain. A smart contract used to manage a user element authentication procedure is deployed in the blockchain, and the method includes: receiving a smart contract invocation transaction, where the smart contract invocation transaction includes an encrypted, to-be-authenticated user element that is provided by a user client and that is used to determine authenticity of a user identity; in response to the smart contract invocation transaction, invoking encryption conversion logic in the smart contract, decrypting the encrypted to-be-authenticated user element in a trusted computing environment on the node device, and further performing secondary encryption processing on a decrypted, to-be-authenticated user element, where a decryption key corresponding to the secondary encryption processing is maintained by a user element authentication authority, so that the user element authentication authority obtains a to-be-authenticated user element obtained after secondary encryption processing, decrypts the to-be-authenticated user element based on the decryption key, and performs user element authentication based on the decrypted, to-be-authenticated user element; and obtaining an authentication result submitted by the user element authentication authority to the smart contract for the to-be-authenticated user element, and storing the authentication result in a distributed ledger of the blockchain, so that an authentication result user connected to the blockchain obtains the authentication result from the distributed ledger of the blockchain, and determines, based on the authentication result, authenticity of a user identity provided by the user client.

According to a second aspect of the embodiments of this specification, a blockchain-based user element authentication apparatus is disclosed, and is applied to a node device in the blockchain. A smart contract used to manage a user element authentication procedure is deployed in the blockchain, and the apparatus includes: a receiving module, configured to receive a smart contract invocation transaction, where the smart contract invocation transaction includes an encrypted to-be-authenticated user element that is provided by a user client and that is used to determine authenticity of a user identity; an authentication module, configured to: in response to the smart contract invocation transaction, invoke encryption conversion logic in the smart contract, decrypt the encrypted to-be-authenticated user element in a trusted computing environment on the node device, and further perform secondary encryption processing on a decrypted to-be-authenticated user element, where a decryption key corresponding to the secondary encryption processing is maintained by a user element authentication authority, so that the user element authentication authority obtains a to-be-authenticated user element obtained after secondary encryption processing, decrypts the to-be-authenticated user element based on the decryption key, and performs user element authentication based on the decrypted to-be-authenticated user element; and a storage module, configured to: obtain an authentication result submitted by the user element authentication authority to the smart contract for the to-be-authenticated user element, and store the authentication result in a distributed ledger of the blockchain, so that an authentication result user connected to the blockchain obtains the authentication result from the distributed ledger of the blockchain, and determines, based on the authentication result, authenticity of a user identity provided by the user client.

In the above-mentioned technical solution, the user client, the authentication authority, and the authentication result user do not need to independently communicate a service or establish a connection, but can complete an entire service procedure of user element authentication by interacting with the blockchain. Therefore, operation efficiency of a user element authentication service can be significantly improved. In addition, a process in which the blockchain node performs encryption conversion on the to-be-authenticated user element is completed in the trusted execution environment. Therefore, in this solution, in principle, the node device in the blockchain cannot obtain the to-be-authenticated user element in a plaintext form, thereby ensuring that privacy information in the to-be-authenticated user element of the user is not disclosed, and improving security of the user element authentication service.

BRIEF DESCRIPTION OF DRAWINGS

The accompanying drawings here are incorporated into this specification, constitute a part of this specification, illustrate embodiments that conform to this specification, and are used to explain principles together with this specification.

DESCRIPTION OF EMBODIMENTS

Figure 1:
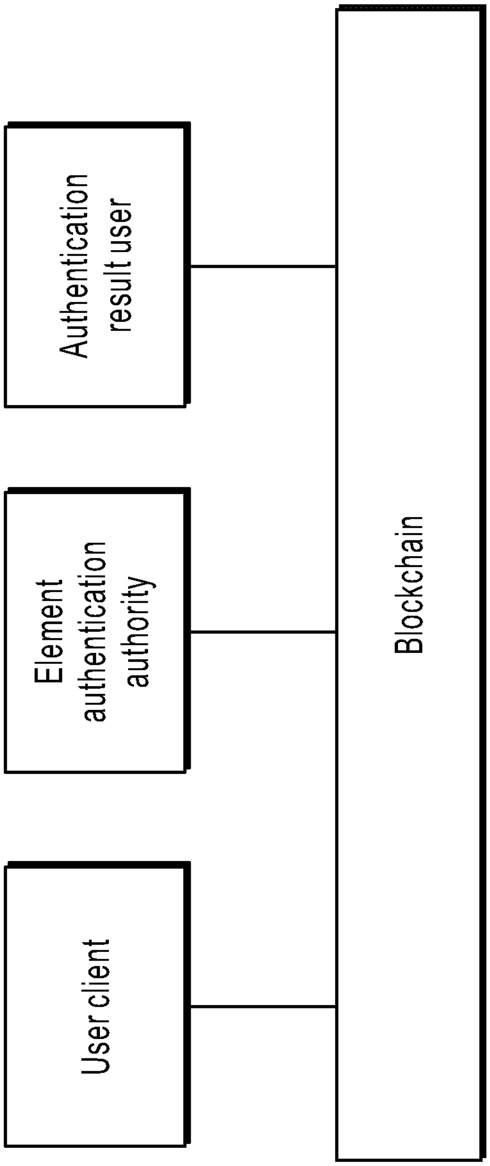
FIG. 1 is an example diagram illustrating a blockchain-based user element authentication scenario, according to this specification.

To make a person skilled in the art better understand the technical solutions in one or more embodiments of this specification, the following clearly and comprehensively describes the technical solutions in the one or more embodiments of this specification with reference to the accompanying drawings in the one or more embodiments of this specification. Clearly, the described embodiments are merely some rather than all of the embodiments. All other embodiments obtained by a person of ordinary skill in the art based on one or more embodiments of this specification without creative efforts shall fall within the protection scope of this specification.

When the following descriptions relate to the accompanying drawings, unless specified otherwise, the same numbers in different accompanying drawings represent the same or similar elements. Implementations described in the following example embodiments do not represent all implementations consistent with this specification. On the contrary, the embodiments are merely examples of systems and methods that are described in the appended claims in details and consistent with some aspects of this specification.

The terms used in this specification are merely for illustrating specific embodiments, and are not intended to limit this specification. The terms "a" and "the" of singular forms used in this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in this specification to describe various types of information, the information is not limited to the terms. These terms are merely used to differentiate between information of the same type. For example, without departing from the scope of this specification, first information can also be referred to as second information, and similarly, the second information can be referred to as the first information. Depending on the context, for example, the word "if" used here can be explained as "while", "when", or "in response to determining".

User element authentication usually means that a specific user element authentication authority determines whether several pieces of user element information including privacy information that are provided by a user match the specific user element authentication authority, to determine authenticity of an identity of an object indicated by the several pieces of user element information. For example, a citizen can provide information such as a name, an identification card number, and an address, to prove an identity of the citizen. A merchant can provide information such as a name and a license number of a business individual, to prove an identity of the business individual. Usually, an individual such as a communication operator, a public security network database, a bank database, or a business administration database that can store a correspondence between user elements can serve as the user element authentication authority to provide a user element authentication service. However, in actual application scenarios, a large quantity of user element providers, user element authentication result users, and user element authentication authorities may coexist. Therefore, it is difficult for the user to quickly identify a proper authentication authority to complete a user element authentication process.

In a related technology, a role of a mediator can be added to the above-mentioned interaction scenario. A user only needs to send a to-be-authenticated user element to the mediator without being concerned about a subsequent procedure. An authentication authority only needs to obtain the to-be-authenticated user element from the mediator, and returns a corresponding user element authentication result, without a need to directly contact a user element provider and an authentication result user. In this solution, execution efficiency of a user element authentication service can be greatly improved, and user experience can be greatly improved. However, in this solution, the user needs to send a user element including privacy data to the mediator, leading to unnecessary disclosure of privacy information. Usually, because a higher degree of privacy of user element information provided by the user means that it is more difficult for an identity forger to obtain and spoof the user element information, a user element authentication result is more reliable. Therefore, to ensure a final effect of user element authentication, the user cannot reduce a degree of privacy of a user element to reduce disclosure of the privacy information. Therefore, a user element authentication solution in which both high efficiency and high security are considered is urgently needed in the industry.

Based on this, this specification discloses a technical solution in which a user element authentication procedure is managed by using a smart contract executed in a trusted execution environment in a blockchain.

In an implementation, FIG. 1 is an example diagram illustrating a blockchain-based user element authentication scenario, according to this specification. In this example, a blockchain serves as a mediator in a user element authentication scenario, and the above-mentioned user client, user element authentication authority, and authentication result user do not need to independently communicate a service or establish a connection. In addition, in this example, from the user client to the blockchain, and then to the user element authentication authority, a to-be-authenticated user element can be encrypted in a whole process, and a smart contract in the blockchain completes conversion in an encrypted form in a trusted execution environment (TEE).

In the above-mentioned technical solution, the user client, the user element authentication authority, and the authentication result user do not need to independently communicate a service or establish a connection, but can complete an entire service procedure of user element authentication by interacting with the blockchain. Therefore, operation efficiency of a user element authentication service can be significantly improved. In addition, a process in which a blockchain node performs encryption conversion on the to-be-authenticated user element is completed in the trusted execution environment. Therefore, in this solution, in principle, the node device in the blockchain cannot obtain the to-be-authenticated user element in a plaintext form, thereby ensuring that privacy information in the to-be-authenticated user element of the user is not disclosed, and improving security of the user element authentication service.

Blockchains are usually classified into three types: a public blockchain, a private blockchain, and a consortium blockchain. In addition, there can be a combination of the above-mentioned plurality of types such as a combination of a private blockchain and a consortium blockchain, and a combination of a consortium blockchain and a public blockchain.

Public blockchains have the highest degree of decentralization. Bitcoin and Ethereum are representatives of the public blockchain. A participant (also referred to as a node in the blockchain) joining the public blockchain can read a data record in the blockchain, participate in a transaction, contend for accounting permission of a new block, etc. In addition, each node can freely join or exit a network, and perform a related operation.

On the contrary, for private blockchains, write permission of the network is controlled by a certain organization or authority, and data read permission is specified by the organization. In short, the private blockchain can be a weakly centralized system. In the private blockchain, a node is strictly limited, and there is a small quantity of nodes. This type of blockchain is more suitable for internal use of a specific authority.

Consortium blockchains fall between public and private blockchains and can achieve "partial decentralization." Each node in the consortium blockchain usually has a corresponding entity authority or organization. The node is authorized to join the network and form a stakeholder alliance, to jointly maintain operation of the blockchain.

Based on a basic characteristic of the blockchain, the blockchain usually includes several blocks. Timestamps corresponding to creation moments of the blocks are respectively recorded in the blocks, and all the blocks form a time-ordered data chain strictly following the timestamps recorded in the blocks.

Real data generated by a physical world can be created into a standard transaction format supported by the blockchain, and then published to the blockchain, and the node device in the blockchain performs consensus processing on a received transaction. After a consensus is reached, the transaction is packaged into a block by the node device that serves as an accounting node in the blockchain, and is stored persistently in the blockchain.

In actual applications, each of the public blockchain, the private blockchain, and the consortium blockchain may provide a function of the smart contract. The smart contract in the blockchain is a contract whose execution can be triggered by a transaction in the blockchain. The smart contract can be described in a form of code.

Ethereum is used as an example. A user is supported to create and invoke some complex logic in an Ethereum network. Ethereum is a programmable blockchain, and a core of Ethereum is an Ethereum virtual machine (EVM). Each Ethereum node can run the EVM. The EVM is a Turing-complete virtual machine, and various complex logic can be implemented through the EVM. The smart contract published and invoked by the user in Ethereum is run on the EVM. In fact, the EVM directly runs virtual machine code (virtual machine bytecode, briefly referred to as "bytecode" below). Therefore, the smart contract deployed on the blockchain can be bytecode.

Figure 2:
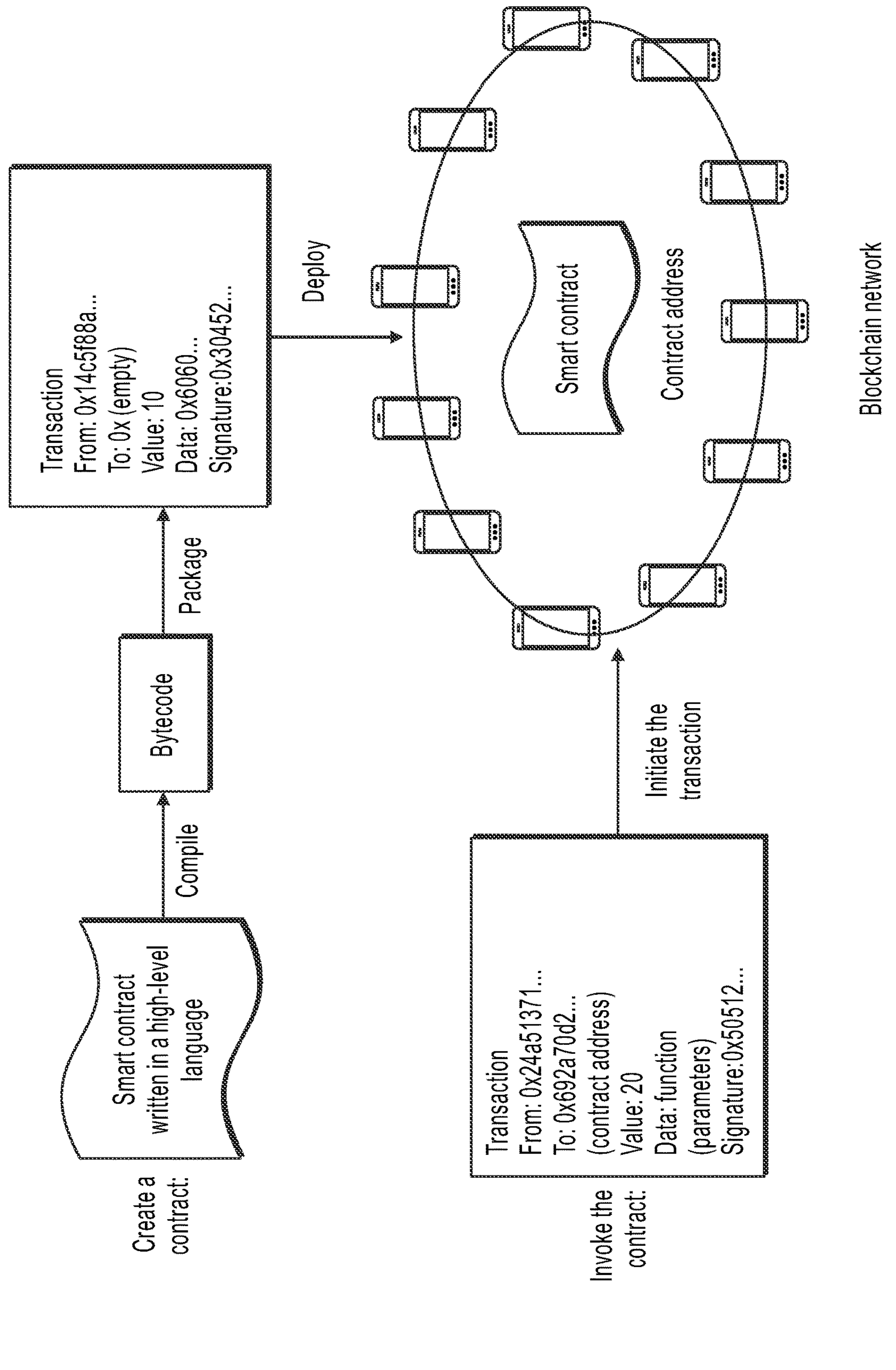
FIG. 2 is a schematic diagram illustrating a process of creating and invoking the smart contract, according to this specification.

FIG. 2 is a schematic diagram illustrating creation of a smart contract and invocation of the smart contract. As shown in FIG. 2, creating a smart contract in Ethereum includes processes such as writing the smart contract, changing the smart contract to bytecode, and deploying the bytecode in the blockchain. Invoking the smart contract in Ethereum is initiating a transaction directed to an address of the smart contract. An EVM of each node can execute the transaction, and run smart contract code in a virtual machine of each node in an Ethernet network in a distributed method.

The following describes this specification by using a specific embodiment and with reference to a specific application scenario.

Figure 3:
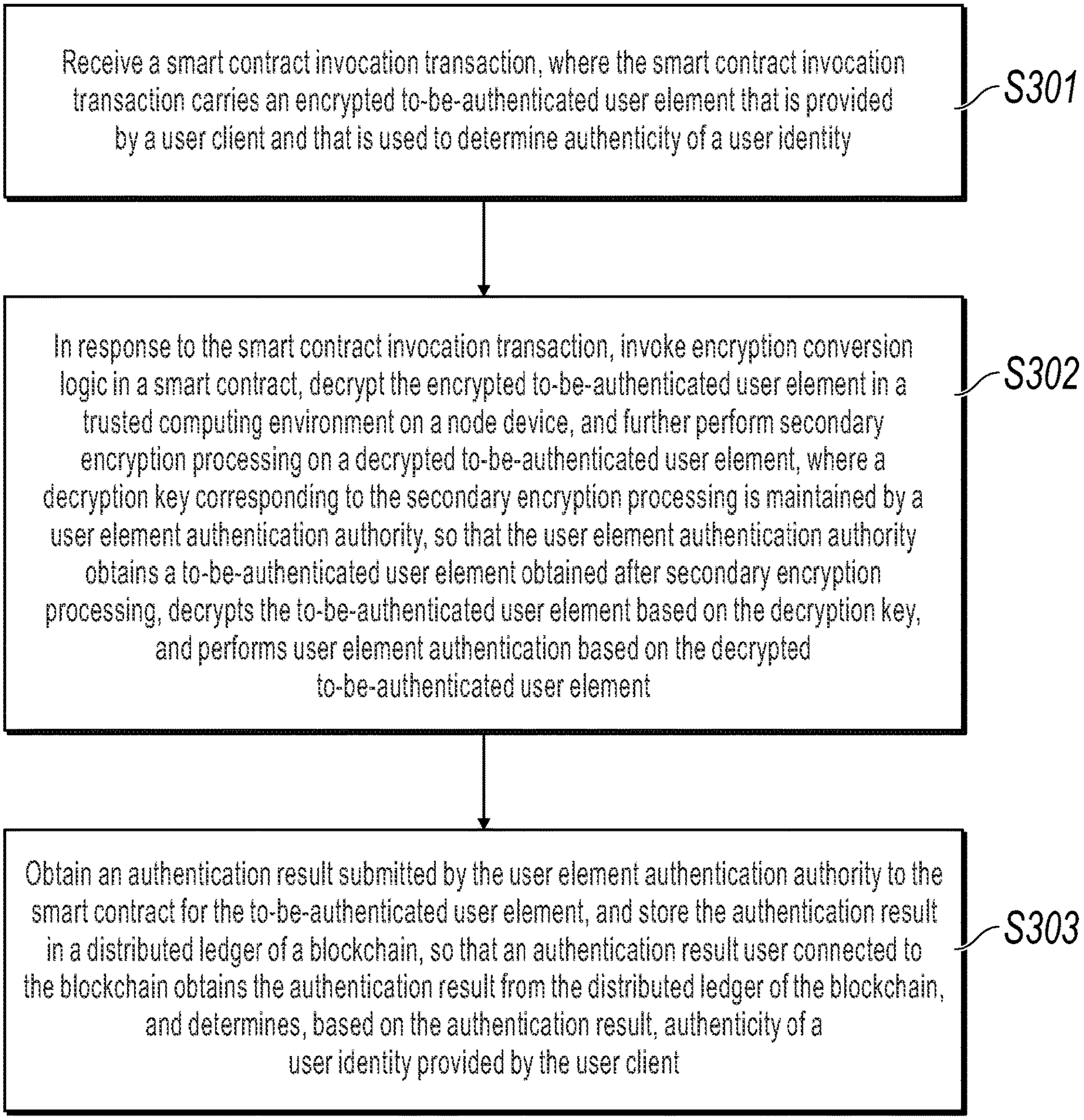
FIG. 3 is an example diagram illustrating a procedure of the blockchain-based user element authentication method, according to this specification.

FIG. 3 is an example diagram illustrating a procedure of the blockchain-based user element authentication method, according to this specification. The method can be applied to a node device in a blockchain. A smart contract used to manage a user element authentication procedure is deployed in the blockchain, and the method can include the following steps: S301: Receive a smart contract invocation transaction, where the smart contract invocation transaction includes an encrypted to-be-authenticated user element that is provided by a user client and that is used to determine authenticity of a user identity. S302: In response to the smart contract invocation transaction, invoke encryption conversion logic in the smart contract, decrypt the encrypted to-be-authenticated user element in a trusted computing environment on the node device, and further perform secondary encryption processing on a decrypted to-be-authenticated user element, where a decryption key corresponding to the secondary encryption processing is maintained by a user element authentication authority, so that the user element authentication authority obtains a to-be-authenticated user element obtained after secondary encryption processing, decrypts the to-be-authenticated user element based on the decryption key, and performs user element authentication based on the decrypted to-be-authenticated user element. S303: Obtain an authentication result submitted by the user element authentication authority to the smart contract for the to-be-authenticated user element, and store the authentication result in a distributed ledger of the blockchain, so that an authentication result user connected to the blockchain obtains the authentication result from the distributed ledger of the blockchain, and determines, based on the authentication result, authenticity of a user identity provided by the user client.

The blockchain can include a blockchain in any form. As mentioned above, a public blockchain has a higher degree of decentralization. This means that the public blockchain is more reliable, but has lower execution efficiency. On the contrary, a private blockchain has a small scale and a limited range, usually has higher execution efficiency, but is less reliable than a large-scale public blockchain. Therefore, a person skilled in the art can independently select and complete specific blockchain creation based on a specific service need and various forms of features of blockchains. Implementations are not further limited in this specification.

The user client can include any software and hardware that can provide the above-mentioned related functions. For example, the user client can be a dedicated hardware client, an independently designed software client, an applet based on another application, a web page with an interaction capability, etc. A person skilled in the art can complete a specific development design based on a specific service need and with reference to a related technical document. Implementations are not further limited in this specification.

The user element can include any user element used for user element authentication. It can be understood that a specific type of the user element authentication authority can match the to-be-authenticated user element. For example, if the to-be-authenticated user element includes a name and an identification card number of a user, the corresponding user element authentication authority can be a related authority that stores a correspondence between a name and an identification card number of the user, for example, a public security network. For another example, if the to-be-authenticated user element includes a company name and a business license number of a merchant, the corresponding user element authentication authority can be an authority that stores a correspondence between a company name and a business license number, for example, a business administration department. A person skilled in the art can independently select an application scenario and a user element type based on a specific need. Details do not need to be enumerated in this specification.

In a shown implementation, the to-be-authenticated user element can be identity information of the user. Because the user usually pays more attention to protecting privacy data of the user, when identity information related to privacy needs to be used as the to-be-authenticated user element, user element authentication is performed based on the above-mentioned solution, to eliminate a possibility that a "mediator" grabs identity information and privacy is disclosed.

In a shown implementation, the identity information of the user can include the name, the identification card number, and a mobile phone number of the user. Corresponding to the identity information, the user element authentication authority can be a mobile phone operator. For example, if a user Zhang San needs to perform an account opening service in a bank, the user needs to provide a name, an identification card number, and a mobile phone number of the user to the bank, and complete user element authentication based on the name, the identification card number, and the mobile phone number. Usually, a correspondence among the three user elements can be stored in a database of a mobile phone operator. Therefore, the mobile phone operator can serve as a user element authentication authority of current user element authentication. It can be understood that, user element authentication performed based on the mobile phone operator is only a common implementation form of user element authentication, and should not be considered as an improper limitation on the solution of this specification.

In this specification, the node device in the blockchain can first receive the smart contract invocation transaction from the user client. The smart contract invocation transaction can include the encrypted to-be-authenticated user element that is used to determine the authenticity of the user identity. As described above, a pre-deployed smart contract in the blockchain can be invoked by using a transaction, and data needed for executing the smart contract can be carried in the invocation transaction, to complete information exchange. Because it needs to be ensured that the to-be-authenticated user element is not disclosed, the node device in the blockchain cannot directly read a plaintext of the to-be-authenticated user element. Therefore, in the smart contract invocation transaction, the to-be-authenticated user element can be a ciphertext obtained by the user client through encryption. It can be understood that, the smart contract invocation transaction can be directly initiated by the client, or can be indirectly initiated by another server, a forwarding platform, etc. For example, to ensure running efficiency and security of the blockchain, it can be set that only a specific server has permission to initiate the smart contract invocation transaction to the blockchain. In this case, the user client can first send a ciphertext of the to-be-authenticated user element to a server that has permission, and then the server generates a corresponding smart contract invocation transaction, and sends the smart contract invocation transaction to the blockchain.

In a shown implementation, the node device can be connected to the server. In this environment, the user client can add the ciphertext of the to-be-authenticated user element to a user element authentication request, and send the user element authentication request to the server. The server creates the smart contract invocation transaction based on the encrypted to-be-authenticated user element, and sends the smart contract invocation transaction to the node device connected to the server. This design can further develop functions such as design permission control and fee calculation on the server, to adapt to a more complex service environment need. Implementations are not further limited in this specification. A person skilled in the art can complete a specific design with reference to a related technical document.

In this specification, the node device can invoke the encryption conversion logic in the smart contract in response to the smart contract invocation transaction, and decrypt the encrypted to-be-authenticated user element in the trusted computing environment on the node device. Because the trusted computing environment is in an unobservable black box state for the outside, even if the above-mentioned decryption process is completed in the trusted computing environment, privacy data in the to-be-authenticated user element is not disclosed. After decryption is completed, secondary encryption processing can be further performed on the decrypted to-be-authenticated user element. A decryption key corresponding to the second encryption processing can be maintained by the user element authentication authority. For example, the above-mentioned two times of encryption and decryption can be performed in an asymmetric encryption method. It is assumed that the trusted computing environment on the node device maintains a private key A1, a corresponding public key A2 is held by the user client, the user element authentication authority can hold a private key B1, and a corresponding public key B2 is held by the trusted computing environment on the node device. When the above-mentioned solution is implemented, the user client can encrypt the to-be-authenticated user element by using the public key A2, and send the to-be-authenticated user element to the node device in a form of a smart contract invocation transaction. The user client can complete a first time of decryption by using the maintained private key A1 in the trusted computing environment on the node device, and perform secondary encryption on the decrypted to-be-authenticated user element by using the public key B2, to obtain a to-be-authenticated user element that is obtained after the second encryption processing and that can only be decrypted by a user element authentication authority that holds the private key B1.

It can be understood that, the above-mentioned key use process is only a feasible example, and a specific password mechanism can be selected and designed based on a specific service need. Implementations are not further limited in this specification.

In this specification, the node device can execute the above-mentioned secondary encryption processing process, so that the user element authentication authority obtains the to-be-authenticated user element obtained after secondary encryption processing, decrypts the to-be-authenticated user element based on the decryption key, and performs user element authentication based on the decrypted to-be-authenticated user element. Specifically, because the node device in the blockchain plays a role of a mediator in the above-mentioned service scenario, when a quantity of users initiating user element authentication and a quantity of user element authentication authorities are large, a corresponding user element authentication authority can be allocated, based on a predetermined matching mechanism, to the user initiating user element authentication, to ensure smooth execution of a user element authentication service. Specifically, a method of selecting the user element authentication authority can be based on a type of the to-be-authenticated user element. For example, for a to-be-authenticated user element related to a mobile number, a mobile phone operator can be identified as a to-be-authenticated user element authentication authority; and for a to-be-authenticated user element related to a bank card number, a bank can be identified as a corresponding user element authentication authority. It can be understood that, although content of the to-be-authenticated user element can be encrypted, the type of the to-be-authenticated user element can be identified by predetermining a flag bit or attaching a label. Therefore, a person skilled in the art can independently design, based on a specific need, the method of selecting the user element authentication authority.

In a shown implementation, the smart contract invocation transaction can further include an identifier of a target user element authentication authority specified by the user client. In this case, it can be designed that only the target user element authentication authority can decrypt the to-be-authenticated user element obtained after the node device performs secondary encryption. Therefore, after the smart contract invocation transaction is received, a predetermined encryption key table can be queried to obtain a secondary encryption key corresponding to the target user element authentication authority. When secondary encryption processing is performed on the decrypted to-be-authenticated user element, the determined secondary encryption key corresponding to the target user element authentication authority can be used. Correspondingly, when the user element authentication authority obtains the to-be-authenticated user element obtained after secondary encryption processing, performs secondary decryption on the to-be-authenticated user element, and performs user element authentication based on the to-be-authenticated user element obtained after decryption, it can be directly specified that the target user element authentication authority corresponding to the identifier obtains the to-be-authenticated user element obtained after secondary encryption processing, performs secondary decryption on the to-be-authenticated user element, and performs user element authentication based on the to-be-authenticated user element obtained after decryption.

It can be understood that, a method in which the user element authentication authority generates a user element authentication result based on the to-be-authenticated user element, for example, querying a database storing a correspondence of the to-be-authenticated user element, does not need to be specifically limited in this specification. A person skilled in the art can independently determine an implementation based on a specific implementation environment and a related need.

In this specification, after the user element authentication authority completes user element authentication, the node device obtains an authentication result submitted by the user element authentication authority to the smart contract for the to-be-authenticated user element, and stores the authentication result in a distributed ledger of the blockchain, so that an authentication result user connected to the blockchain obtains the authentication result from the distributed ledger of the blockchain, and determines, based on the authentication result, authenticity of a user identity provided by the user client. Specifically, as described above, the blockchain plays a role of a mediator in a service scenario of user element authentication. Therefore, the user element authentication result generated by the user element authentication authority can be sent to the authentication result user by using the blockchain. It can be understood that the authentication result user can be the user. For example, the user can obtain, by using the above-mentioned user element authentication process, an authentication success certificate provided by the user element authentication authority for a certain group of to-be-authenticated user elements, so that the user can directly and independently hold the certificate to process another service that needs to ensure that user element authentication succeeds.

In a shown implementation, a specific method in which the authentication result user obtains the authentication result from the distributed ledger of the blockchain can be as follows: The node device stores the authentication result in the distributed ledger of the blockchain, and generates a result return event corresponding to the authentication result. Then, in response to the result return event, the server obtains the authentication result from the distributed ledger of the blockchain, and sends the authentication result to the authentication result user.

It can be understood that, the above-mentioned method in which the server performs forwarding is only a feasible example of returning the authentication result. The authentication result user can alternatively directly obtain the authentication result from the distributed ledger of the blockchain in response to the result return event, or directly fetch the authentication result from newly added content of the distributed ledger of the blockchain based on predetermined identification logic. In addition, in this process, privacy of the authentication result can be further improved in an encryption method. Therefore, a person skilled in the art can independently design, based on a specific need, a specific form in which the user element authentication authority sends the authentication result to the authentication result user by using the blockchain. Implementations are not further limited in this specification.

Figure 4:
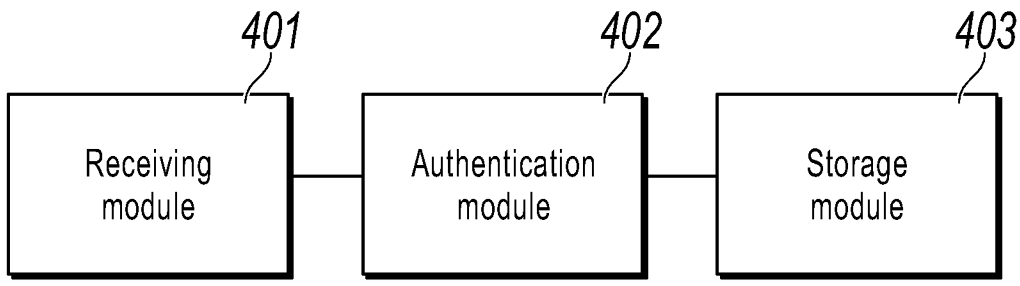
FIG. 4 is an example diagram illustrating a structure of the blockchain-based user element authentication apparatus, according to this specification.

The above-mentioned content is all embodiments of the blockchain-based user element authentication method in this specification. This specification further provides an embodiment of a corresponding blockchain-based user element authentication apparatus as follows: This specification provides a blockchain-based user element authentication apparatus. An example of a structure of the blockchain-based user element authentication apparatus is shown in FIG. 4. The apparatus can be applied to a node device in a blockchain. A smart contract used to manage a user element authentication procedure is deployed in the blockchain, and the apparatus includes: a receiving module 401, configured to receive a smart contract invocation transaction, where the smart contract invocation transaction includes an encrypted to-be-authenticated user element that is provided by a user client and that is used to determine authenticity of a user identity; an authentication module 402, configured to: in response to the smart contract invocation transaction, invoke encryption conversion logic in the smart contract, decrypt the encrypted to-be-authenticated user element in a trusted computing environment on the node device, and further perform secondary encryption processing on a decrypted to-be-authenticated user element, where a decryption key corresponding to the secondary encryption processing is maintained by a user element authentication authority, so that the user element authentication authority obtains a to-be-authenticated user element obtained after secondary encryption processing, decrypts the to-be-authenticated user element based on the decryption key, and performs user element authentication based on the decrypted to-be-authenticated user element; and a storage module 403, configured to: obtain an authentication result submitted by the user element authentication authority to the smart contract for the to-be-authenticated user element, and store the authentication result in a distributed ledger of the blockchain, so that an authentication result user connected to the blockchain obtains the authentication result from the distributed ledger of the blockchain, and determines, based on the authentication result, authenticity of a user identity provided by the user client.

In a shown implementation, the node device can be connected to a server. In this environment, the user client can add a ciphertext of the to-be-authenticated user element to a user element authentication request, and send the user element authentication request to the server. The server creates the smart contract invocation transaction based on the encrypted to-be-authenticated user element, and sends the smart contract invocation transaction to the node device connected to the server. This design can further develop functions such as design permission control and fee calculation on the server, to adapt to a more complex service environment need. Implementations are not further limited in this specification. A person skilled in the art can complete a specific design with reference to a related technical document.

In a shown implementation, the smart contract invocation transaction can further include an identifier of a target user element authentication authority specified by the user client. In this case, the target user element authentication authority can decrypt the to-be-authenticated user element obtained after the node device performs secondary encryption. Therefore, the apparatus can further include a querying module. After the smart contract invocation transaction is received, the module can query a predetermined encryption key table to obtain a secondary encryption key corresponding to the target user element authentication authority. When the authentication module 402 performs secondary encryption processing on the decrypted to-be-authenticated user element, the secondary encryption key corresponding to the target user element authentication authority can be used. Correspondingly, when the user element authentication authority obtains the to-be-authenticated user element obtained after secondary encryption processing, performs secondary decryption on the to-be-authenticated user element, and performs user element authentication based on the to-be-authenticated user element obtained after decryption, the conversion module 402 can directly specify that the target user element authentication authority corresponding to the identifier obtains the to-be-authenticated user element obtained after secondary encryption processing, performs secondary decryption on the to-be-authenticated user element, and performs user element authentication based on the to-be-authenticated user element obtained after decryption.

In a shown implementation, a specific method in which the storage module 403 enables the authentication result user to obtain the authentication result from the distributed ledger of the blockchain can be as follows: The storage module 403 stores the authentication result in the distributed ledger of the blockchain, and generates a result return event corresponding to the authentication result. Then, in response to the result return event, the server obtains the authentication result from the distributed ledger of the blockchain, and sends the authentication result to the authentication result user.

It can be understood that, the above-mentioned method in which the server performs forwarding is only a feasible example of returning the authentication result. The authentication result user can alternatively directly obtain the authentication result from the distributed ledger of the blockchain in response to the result return event, or directly fetch the authentication result from newly added content of the distributed ledger of the blockchain based on predetermined identification logic. In addition, in this process, privacy of the authentication result can be further improved in an encryption method. Therefore, a person skilled in the art can independently design, based on a specific need, a specific form in which the user element authentication authority sends the authentication result to the authentication result user by using the blockchain. Implementations are not further limited in this specification.

In a shown implementation, the to-be-authenticated user element can be identity information of the user. Because the user usually pays more attention to protecting privacy data of the user, when identity information related to privacy needs to be used as the to-be-authenticated user element, user element authentication is performed based on the above-mentioned solution, to eliminate a possibility that a "mediator" grabs identity information and privacy is disclosed.

In a shown implementation, the identity information of the user can include the name, the identification card number, and a mobile phone number of the user. Corresponding to the identity information, the user element authentication authority can be a mobile phone operator. For example, if a user Zhang San needs to perform an account opening service in a bank, the user needs to provide a name, an identification card number, and a mobile phone number of the user to the bank, and complete user element authentication based on the name, the identification card number, and the mobile phone number. Usually, a correspondence among the three user elements can be stored in a database of a mobile phone operator. Therefore, the mobile phone operator can serve as a user element authentication authority of current user element authentication. It can be understood that, user element authentication performed based on the mobile phone operator is only a common implementation form of user element authentication, and should not be considered as an improper limitation on the solution of this specification.

An embodiment of this specification further provides a computer device. The computer device includes at least a memory, a processor, and a computer program that is stored in the memory and that can run on the processor. When the processor executes the program, the blockchain-based user element authentication method is implemented.

Figure 5:
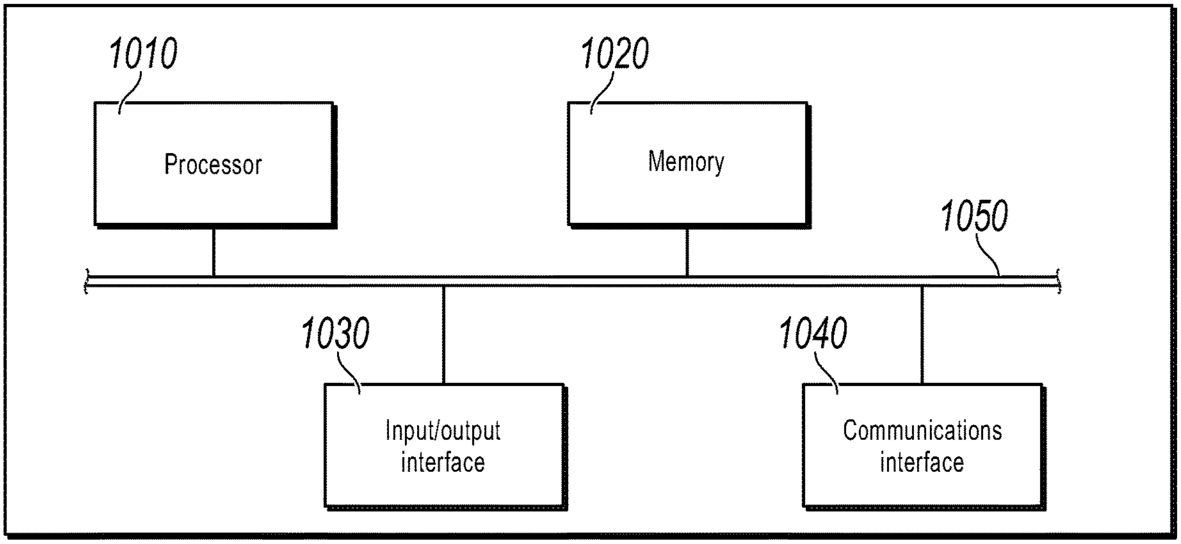
FIG. 5 is an example diagram illustrating a structure of the computer device, according to this specification.

FIG. 5 is a schematic diagram illustrating a more specific hardware structure of a computing device, according to an embodiment of this specification. The device can include a processor 1010, a memory 1020, an input/output interface 1030, a communication interface 1040, and a bus 1050. The processor 1010, the memory 1020, the input/output interface 1030, and the communication interface 1040 are communicatively connected to each other within the device through the bus 1050.

The processor 1010 can be implemented in a form of a general-purpose central processing unit (CPU), a microprocessor, an application-specific integrated circuit (ASIC), one or more integrated circuits, etc., and is configured to execute a related program, to implement the technical solutions provided in the embodiments of this specification.

The memory 1020 can be implemented in a form of a read-only memory (ROM), a random access memory (RAM), a static storage device, a dynamic storage device, etc. The memory 1020 can store an operating system and another application program. When the technical solutions provided in the embodiments of this specification are implemented by software or firmware, related program code is stored in the memory 1020, and invoked and executed by the processor 1010.

The input/output interface 1030 is configured to connect an input/output module to implement information input and output. The input/output module can be configured as a component in the device (not shown in the figure), or can be externally connected to the device to provide a corresponding function. The input device can include a keyboard, a mouse, a touchscreen, a microphone, various sensors, etc., and the output device can include a display, a speaker, a vibrator, an indicator, etc.

The communication interface 1040 is configured to connect a communication module (not shown in the figure) to implement communication and interaction between the device and another device. The communication module can implement communication in a wired method (for example, a USB or a network cable) or in a wireless method (for example, a mobile network, Wi-Fi, or Bluetooth).

The bus 1050 includes a path to transmit information between various components (for example, the processor 1010, the memory 1020, the input/output interface 1030, and the communication interface 1040) of the device.

It is worthwhile to note that, although only the processor 1010, the memory 1020, the input/output interface 1030, the communication interface 1040, and the bus 1050 are shown in the device, in an actual implementation process, the device can further include another component that is necessary for normal operation. In addition, a person skilled in the art can understand that, the device can include only the component that is necessary for implementing the solutions in the embodiments of this specification, and does not necessarily include all the components shown in the figure.

An embodiment of this specification further provides a computer-readable storage medium. The computer-readable storage medium stores a computer program, and when the program is executed by a processor, the blockchain-based user element authentication method is implemented.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It can be seen from the descriptions of the implementations that, a person skilled in the art can clearly understand that the embodiments of this specification can be implemented by using software and a necessary general hardware platform. Based on such an understanding, the technical solutions in the embodiments of this specification essentially or the part contributing to the existing technology can be implemented in a form of a software product. The computer software product can be stored in a storage medium, for example, a ROM/RAM, a magnetic disk, or an optical disc, and includes some instructions for instructing a computer device (which can be a personal computer, a server, a network device, etc.) to perform the method described in the embodiments of this specification or in some parts of the embodiments.

The system, apparatus, module, or unit illustrated in the embodiments can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending and receiving device, a game console, a tablet computer, a wearable device, or any combination of several of these devices.

The embodiments in this specification are described in a progressive way. For same or similar parts of the embodiments, references can be made to the embodiments mutually. Each embodiment focuses on a difference from other embodiments. In particular, the apparatus embodiments are basically similar to the method embodiments, and therefore are described briefly. For related parts, references can be made to related descriptions in the method embodiments. The described apparatus embodiments are merely examples. The modules described as separate parts can or do not have to be physically separate. During implementation of the solutions in the embodiments of this specification, functions of the modules can be implemented in one or more pieces of software and/or hardware. Some or all of the modules can be selected based on an actual need to implement the solutions of the embodiments. A person of ordinary skill in the art can understand and implement the embodiments without creative efforts.

The above-mentioned descriptions are merely specific implementations of the embodiments of this specification. It is worthwhile to note that a person of ordinary skill in the art can further make some improvements or polishing without departing from the principle of the embodiments of this specification, and the improvements or polishing shall fall within the protection scope of the embodiments of this specification.

What is claimed is:

1. A computer-implemented method comprising:

receiving, by a node device in a blockchain, a smart contract invocation transaction, wherein the smart contract invocation transaction comprises (i) an encrypted to-be-authenticated user element that is provided by a user client and that is used to determine authenticity of a user identity and (ii) an identifier of a target user element authentication authority specified by the user client, wherein a smart contract used to manage a user element authentication procedure is deployed in the blockchain, and wherein the target user element authentication authority is one of a plurality of user element authentication authorities connected to the node device;

in response to the smart contract invocation transaction, invoking, by the node device in the blockchain, encryption conversion logic in the smart contract;

decrypting, by the node device in the blockchain, the encrypted to-be-authenticated user element in a trusted computing environment on the node device to obtain a decrypted to-be-authenticated user element;

querying, by the node device in the blockchain, using the identifier of the target user element authentication authority specified by the user client, a predetermined encryption key table to determine a target secondary encryption key corresponding to the target user element authentication authority;

performing, by the node device in the blockchain, secondary encryption processing on the decrypted to-be-authenticated user element based on the target secondary encryption key to obtain a re-encrypted to-be-authenticated user element, wherein a target decryption key corresponding to the target secondary encryption key used to perform the secondary encryption processing is maintained by the target user element authentication authority;

obtaining, by the node device in the blockchain, an authentication result submitted by the target user element authentication authority to the smart contract for the encrypted to-be-authenticated user element, wherein the authentication result is obtained by the target user element authentication authority by decrypting the re-encrypted to-be-authenticated user element based on the target decryption key to obtain a re-decrypted to-be-authenticated user element, and performing user element authentication based on the re-decrypted to-be-authenticated user element; and storing, by the node device in the blockchain, the authentication result in a distributed ledger of the blockchain, wherein the authentication result is received from the distributed ledger of the blockchain by an authentication result user connected to the blockchain to determine authenticity of the user identity provided by the user client.

2. The computer-implemented method according to claim 1, wherein the node device is connected to a server; and the smart contract invocation transaction comprises a smart contract invocation transaction created by the server in response to a user element authentication request sent by the user client and based on the encrypted to-be-authenticated user element carried in the user element authentication request.

3. The computer-implemented method according to claim 2, wherein the storing the authentication result in a distributed ledger of the blockchain, wherein the authentication result is received from the distributed ledger of the blockchain by an authentication result user connected to the blockchain to determine authenticity of the user identity provided by the user client comprises:

storing the authentication result in the distributed ledger of the blockchain, and generating a result return event corresponding to the authentication result, wherein the authentication result is obtained by the server from the distributed ledger of the blockchain in response to the result return event, and the authentication result is sent to the authentication result user connected to the blockchain.

4. The computer-implemented method according to claim 1, wherein the encrypted to-be-authenticated user element comprises identity information of a user.

5. The computer-implemented method according to claim 4, wherein the identity information of the user comprises a name, an identification card number, and a mobile phone number of the user, and the target user element authentication authority comprises a mobile phone operator.

6. The computer-implemented method according to claim 1, wherein the authentication result user connected to the blockchain obtains the authentication result from the distributed ledger of the blockchain, and determines, based on the authentication result, authenticity of the user identity provided by the user client.

7. A computer-implemented system comprising a node device in a blockchain, wherein the node device comprises:

one or more computers; and one or more computer memory devices interoperably coupled with the one or more computers and having tangible, non-transitory, machine-readable media storing one or more instructions that, when executed by the one or more computers, perform one or more operations comprising:

receiving, by the node device in the blockchain, a smart contract invocation transaction, wherein the smart contract invocation transaction comprises (i) an encrypted to-be-authenticated user element that is provided by a user client and that is used to determine authenticity of a user identity and (ii) an identifier of a target user element authentication authority specified by the user client, wherein a smart contract used to manage a user element authentication procedure is deployed in the blockchain, and wherein the target user element authentication authority is one of a plurality of user element authentication authorities connected to the node device;

in response to the smart contract invocation transaction, invoking, by the node device in the blockchain, encryption conversion logic in the smart contract;

decrypting, by the node device in the blockchain, the encrypted to-be-authenticated user element in a trusted computing environment on the node device to obtain a decrypted to-be-authenticated user element;

querying, by the node device in the blockchain, using the identifier of the target user element authentication authority specified by the user client, a predetermined encryption key table to determine a target secondary encryption key corresponding to the target user element authentication authority;

performing, by the node device in the blockchain, secondary encryption processing on the decrypted to-be-authenticated user element based on the target secondary encryption key to obtain a re-encrypted to-be-authenticated user element, wherein a target decryption key corresponding to the target secondary encryption key used to perform the secondary encryption processing is maintained by the target user element authentication authority;

obtaining, by the node device in the blockchain, an authentication result submitted by the target user element authentication authority to the smart contract for the encrypted to-be-authenticated user element, wherein the authentication result is obtained by the target user element authentication authority by decrypting the re-encrypted to-be-authenticated user element based on the target decryption key to obtain a re-decrypted to-be-authenticated user element, and performing user element authentication based on the re-decrypted to-be-authenticated user element; and storing, by the node device in the blockchain, the authentication result in a distributed ledger of the blockchain, wherein the authentication result is received from the distributed ledger of the blockchain by an authentication result user connected to the blockchain to determine authenticity of the user identity provided by the user client.

8. The computer-implemented system according to claim 7, wherein the node device is connected to a server; and the smart contract invocation transaction comprises a smart contract invocation transaction created by the server in response to a user element authentication request sent by the user client and based on the encrypted to-be-authenticated user element carried in the user element authentication request.

9. The computer-implemented system according to claim 8, wherein the storing the authentication result in a distributed ledger of the blockchain, wherein the authentication result is received from the distributed ledger of the blockchain by an authentication result user connected to the blockchain to determine authenticity of the user identity provided by the user client comprises:

storing the authentication result in the distributed ledger of the blockchain, and generating a result return event corresponding to the authentication result, wherein the authentication result is obtained by the server from the distributed ledger of the blockchain in response to the result return event, and the authentication result is sent to the authentication result user connected to the blockchain.

10. The computer-implemented system according to claim 7, wherein the encrypted to-be-authenticated user element comprises identity information of a user.

11. The computer-implemented system according to claim 10, wherein the identity information of the user comprises a name, an identification card number, and a mobile phone number of the user, and the target user element authentication authority comprises a mobile phone operator.

12. The computer-implemented system according to claim 7, further comprising the target user element authentication authority.

13. The computer-implemented system according to claim 7, further comprising the authentication result user connected to the blockchain, wherein the authentication result user connected to the blockchain obtains the authentication result from the distributed ledger of the blockchain, and determines, based on the authentication result, authenticity of the user identity provided by the user client.

14. A non-transitory, computer-readable medium storing one or more instructions executable by a computer system to perform operations comprising:

receiving, by a node device in a blockchain, a smart contract invocation transaction, wherein the smart contract invocation transaction comprises (i) an encrypted to-be-authenticated user element that is provided by a user client and that is used to determine authenticity of a user identity and (ii) an identifier of a target user element authentication authority specified by the user client, wherein a smart contract used to manage a user element authentication procedure is deployed in the blockchain, and wherein the target user element authentication authority is one of a plurality of user element authentication authorities connected to the node device;

in response to the smart contract invocation transaction, invoking, by the node device in the blockchain, encryption conversion logic in the smart contract;

decrypting, by the node device in the blockchain, the encrypted to-be-authenticated user element in a trusted computing environment on the node device to obtain a decrypted to-be-authenticated user element;

querying, by the node device in the blockchain, using the identifier of the target user element authentication authority specified by the user client, a predetermined encryption key table to determine a target secondary encryption key corresponding to the target user element authentication authority;

performing, by the node device in the blockchain, secondary encryption processing on the decrypted to-be-authenticated user element based on the target secondary encryption key to obtain a re-encrypted to-be-authenticated user element, wherein a target decryption key corresponding to the target secondary encryption key used to perform the secondary encryption processing is maintained by the target user element authentication authority;

obtaining, by the node device in the blockchain, an authentication result submitted by the target user element authentication authority to the smart contract for the encrypted to-be-authenticated user element, wherein the authentication result is obtained by the target user element authentication authority by decrypting the re-encrypted to-be-authenticated user element based on the target decryption key to obtain a re-decrypted to-be-authenticated user element, and performing user element authentication based on the re-decrypted to-be-authenticated user element; and storing, by the node device in the blockchain, the authentication result in a distributed ledger of the blockchain, wherein the authentication result is received from the distributed ledger of the blockchain by an authentication result user connected to the blockchain to determine authenticity of the user identity provided by the user client.

15. The non-transitory, computer-readable medium according to claim 14, wherein the encrypted to-be-authenticated user element comprises identity information of a user.

16. The non-transitory, computer-readable medium according to claim 15, wherein the identity information of the user comprises a name, an identification card number, and a mobile phone number of the user, and the target user element authentication authority comprises a mobile phone operator.

* * * * *